US008992183B2

(12) United States Patent
Perich et al.

(10) Patent No.: US 8,992,183 B2
(45) Date of Patent: Mar. 31, 2015

(54) SYSTEM AND METHODS FOR MOVING OBJECTS INDIVIDUALLY AND IN PARALLEL

(71) Applicant: Cornell University, Ithaca, NY (US)

(72) Inventors: Cheryl Perich, Albuquerque, NM (US); Ashley Macner, Ithaca, NY (US); Hod Lipson, Ithaca, NY (US); Paul Steen, Ithaca, NY (US); Robert MacCurdy, Ithaca, NY (US)

(73) Assignee: Cornell University, Ithaca, NY (US)

( * ) Notice: Subject to any disclaimer, the term of this patent is extended or adjusted under 35 U.S.C. 154(b) by 125 days.

(21) Appl. No.: 13/769,534

(22) Filed: Feb. 18, 2013

(65) Prior Publication Data
US 2014/0069813 A1 Mar. 13, 2014

Related U.S. Application Data

(60) Provisional application No. 61/600,105, filed on Feb. 17, 2012.

(51) Int. Cl.
B01L 9/00 (2006.01)
B01D 61/42 (2006.01)
F04B 19/00 (2006.01)
F04B 19/16 (2006.01)

(52) U.S. Cl.
CPC .............. B01D 61/427 (2013.01); F04B 19/006 (2013.01); F04B 19/16 (2013.01)
USPC ............................ 417/50; 422/502; 137/833

(58) Field of Classification Search
CPC ........... F04B 37/00–37/04; B01L 9/00; B01L 2200/0642; B01L 2300/0861–2300/0874; B01L 2400/0415–2400/0427
USPC ............... 204/600, 643; 417/48–50; 422/502; 137/833
See application file for complete search history.

(56) References Cited

U.S. PATENT DOCUMENTS

2006/0194331 A1* 8/2006 Pamula et al. ................ 436/150
2012/0301324 A1 11/2012 Steen et al.

FOREIGN PATENT DOCUMENTS

DE 102004034839 A1 3/2006
WO 2011091345 A2 7/2011

OTHER PUBLICATIONS

M.J. Vogel & P.H. Steen, "Capillarity-based switchable adhesion", Proceedings of the National Academy of Sciences, USA, vol. 107, No. 8, Feb. 23, 2010, p. 337-3381, SI 1-5.*
Vogel et al., "The electroosmotic droplet switch: Countering capillarity with electrokinetics." PNAS, Aug. 23, 2005, p. 11974-11979, vol. 102, No. 34.

* cited by examiner

Primary Examiner — J. Christopher Ball
(74) Attorney, Agent, or Firm — Valauskas Corder LLC

(57) ABSTRACT

Electro-osmosis is used to create droplets in order to easily, carefully, and quickly pick-and-place millions of objects (ranging in size from millimeters to nanometers) individually or in parallel. Droplets are formed within channels that are individually controlled in order to achieve a predetermined configuration of the selected objects.

12 Claims, 3 Drawing Sheets

US 8,992,183 B2

SYSTEM AND METHODS FOR MOVING OBJECTS INDIVIDUALLY AND IN PARALLEL

CROSS-REFERENCE TO RELATED APPLICATIONS

This application claims priority to U.S. Provisional Application No. 61/600,105, filed Feb. 17, 2012, which is incorporated by reference herein in its entirety.

STATEMENT CONCERNING FEDERALLY SPONSORED RESEARCH

The invention was made with government support under Grant No. W911NF-11-1-0093 awarded by the Defense Advanced Research Projects Agency (DARPA) and Grant No. DGE-0707428 awarded by the National Science Foundation (NSF). The government has certain rights in the invention.

FIELD OF THE INVENTION

The present invention relates generally to fluid mechanics with respect to pick-and-place operations in which objects are picked from one location, transferred to another location, and placed in a precise position. More specifically, the present invention is an electro-osmosis system and methods that facilitates the individual and parallel control of channels of an electro-osmosis device in order to easily, carefully, and quickly select and position objects using liquid droplets. The individual and simultaneous control of the channels allows for the pick up and placement of objects in any configuration or pattern (e.g., checkerboard, criss-cross, one or more rows or columns, etc.).

BACKGROUND OF THE INVENTION

Automated manufacturing processes known as "pick-and-place" processes often include a mechanism that picks or selects an object and transfers it from one location to another in order for the object to be placed in a precise position.

Many manufacturing processes require the assembly of large numbers of miniature components, and the number of such components is likely to grow rapidly as the complexity of products increases. A key bottleneck to the assembly rate and cost is the ability to assemble multiple components in parallel. While many of the contemporary pick-and-place robots can assemble units at rapid rates of several parts per second, these rates will not scale to objects with millions of components. To alleviate this bottleneck, a massively parallel pick-and-place process is needed.

The term "miniature objects" refers to micro- and nano-scale objects. There are three main issues to consider when deciding on a transport method for miniature objects using traditional methods. First, the end effector must typically match either the entire or part of the object shape and has to be able to pick up the object without destroying or damaging it. Second, the devices currently designed to pick up these small objects tend to be extremely fragile, often as fragile as the objects they are trying to pick up. This leads to limitations on the speed of motion, since all objects must be carefully controlled. Finally, repeatability of the picking motion is essential for large scale operations. The repeatability and reliability of the end effector can be increased by using parallel pick-and-place operations.

There have been a number of devices invented in order to move hundreds of small objects. Some look at pick-and-place robotics to individually grasp and move each piece quickly, while others rely on self-assembly through energy minima. From suction to magnets to tweezers, numerous products attempt to quickly move large amounts of small objects efficiently and carefully. However, there is a limitation on size. Once objects get too small, for example, around the range of a millimeter and smaller, it becomes more difficult to handle these delicate objects and to quickly and accurately arrange the objects in a desired configuration. Furthermore, most inventions use single end effectors to pick up objects—greatly increasing the time to move objects—when two or more objects could be moved in parallel and in any configuration or pattern if properly controlled.

Common end effectors for small scale pick-and-place processes today include pipette vacuums, nano- or micro-fabricated tweezers attached to parallelogram arms, and electrostatic singular or dual cylinders. These techniques are difficult to parallelize in order to move many objects at once and lack a universal end effector which allows for picking up objects with different shapes.

Another technique involves the use of chemically activated micro-grippers. While this technique requires low energy input, it requires the submersion of materials into chemicals, which may degrade and deform components. Certain other techniques require external grippers or mechanisms to manipulate the components.

The quest to move small objects quickly, efficiently, and safely has been a goal of robotics and manufacturing since the beginning of mass production. The challenge has grown with the decreasing size of components of technological interest (i.e. electronic components). While there is a lot of diversity in the mechanism of transport such as the number of degrees of freedom in a robotic arm as well as the type and number of end effectors handling the object, there is still a lack of consistency, accuracy, and delicacy in moving micro- and nano-scale objects.

Thus, there is a need to quickly, efficiently and safely move miniature objects individually and in parallel as well as in any configuration or pattern. The present invention satisfies this demand.

SUMMARY OF THE INVENTION

The present invention uses electro-osmosis to selectively transport multiple miniature objects individually and simultaneously. In contrast to previous works which focused on using arrays of droplets to grab a single substrate, each element in the array is controlled individually to create arbitrary patterns of droplets. Due to capillary effects, each array element can then lift objects from predefined positions. The demonstrated fluidic pick-and-place process has two key advantages: (1) it is suitable for transport of fragile and complex objects due to the lack of mechanical contact and (2) it is easily parallelizable to very large arrays for massively parallel pick-and-place.

Some unique features of the invention include the ability to pick up objects in parallel, to control the picking of individual objects using no mechanical devices (only voltage), and the ability to decrease the necessary picking precision due to the induced self-assembly as a result of the droplet seeking the lowest energy state.

Electro-osmosis facilitates the use of a liquid to pick-and-place objects, for example, a liquid with ions (or mobile charge carriers). It is further contemplated that any liquid could be used for different desired surface tensions for the particular surface material of the object to be picked.

Most unique is the ability of the present invention to pick up and place individual objects without using a mechanical mechanism. Many existing devices utilize pick-and-place robots that require extreme precision in end effector placement. The present invention, on the other hand, uses liquid which can be placed on the object with much less precision while still being able to pick up and accurately place the object. This can give a range of tens of microns of error acceptable in end effort accuracy. Using liquid to pick-and-place objects is specifically implemented through electro-osmosis to electrically induce fluid flow by externally applying a small voltage. When a solid and a liquid come into contact (e.g. water in a borosilicate glass frit), the surface groups of the solid are removed leaving behind a layer of charge. Counter-ions from the bulk migrate to the liquid-solid interface to neutralize the excess charge creating an electric double layer. When a tangential electric field is applied, the ions in the diffuse layer respond to an electric charge to move towards the electrode of opposite polarity. As a result of viscosity, the surrounding bulk fluid is convected creating a bulk flow. This phenomenon allows for a constant, pulse-free flow without using any moving mechanical parts.

Most importantly, the present invention incorporates individual channel addressability to selectively pick-and-place miniature objects. Selection and control of individual channels is advantageous in that it helps to avoid the complications involved in creating micro-fabricated tweezers or end effectors such as picking-and-placing multiple objects from/to complicated and irregularly shaped configurations. Where multiple successive pick-and-place events are warranted (i.e. 3D printing), it is necessary to be able to control the configuration for each successive pick-and-place event via activation/deactivation of channels through individual channel addressability.

The present invention can precisely pick-and-place individual objects using both the idea of self-assembly—the use of liquid as a non-mechanical picking and dropping device—and robotic manipulation using a three-dimensional (3D) or "xyz" platform base. It is contemplated that the water droplet size can be varied for particular object sizes by varying things such as the length of time the voltage is applied and the channel diameter to which the droplet contact-line is pinned.

According to the present invention, electro-osmosis to manipulate one or more objects individually or in parallel may be applicable in a variety of industries such as the electronics industry, drug industry, or any industry requiring precision on a small scale. In addition, electro-osmosis facilitates the manipulation of one or more objects in any type of pattern (e.g., checkerboard, criss-cross, one or more rows or columns, etc.).

The present invention and its attributes and advantages may be further understood and appreciated with reference to the detailed description below of one contemplated embodiment, taken in conjunction with the accompanying drawings.

DETAILED DESCRIPTION OF THE INVENTION

Figure 1:
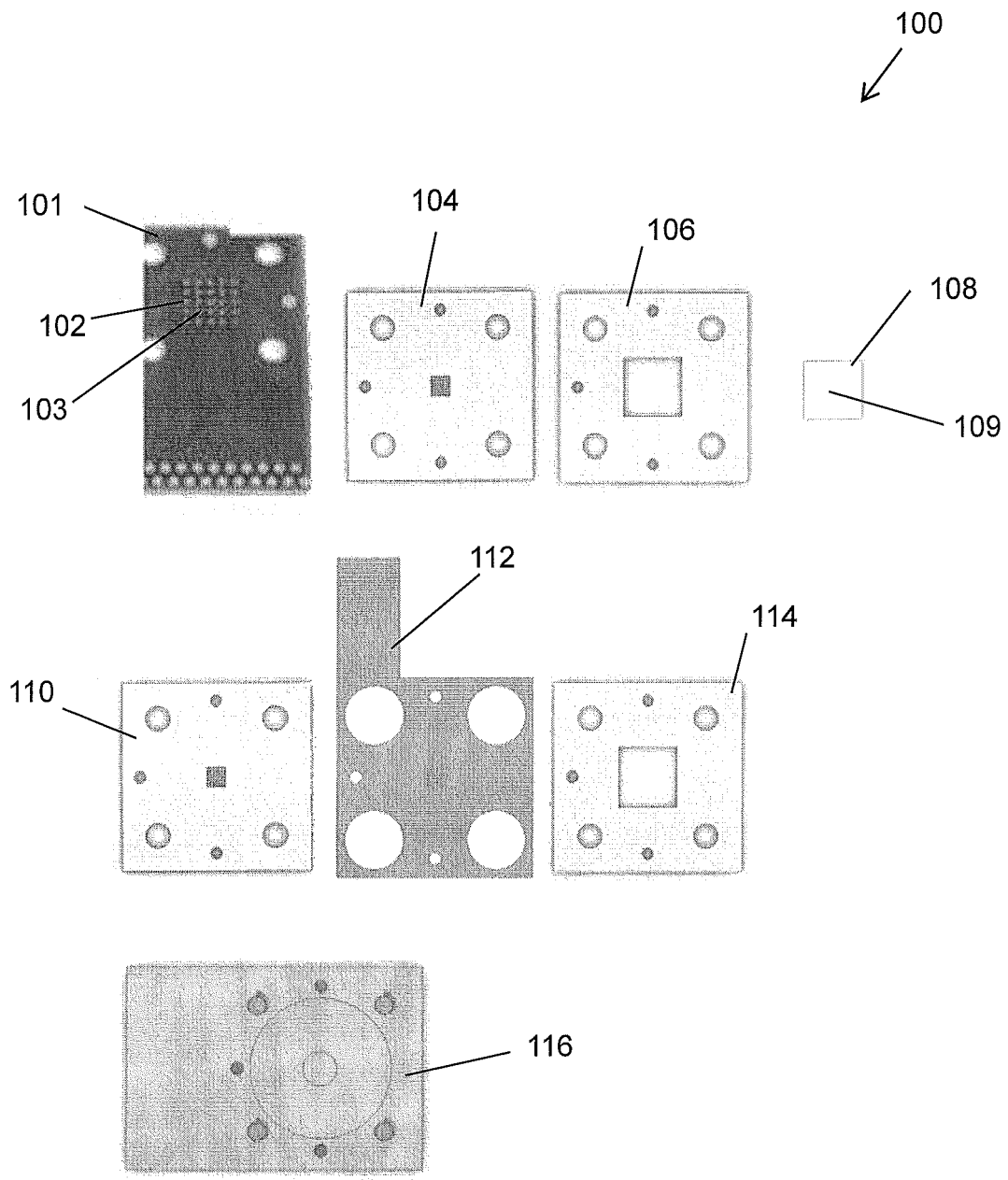
FIG. 1 illustrates the components of the electro-osmosis system according to the present invention.
Figure 2:
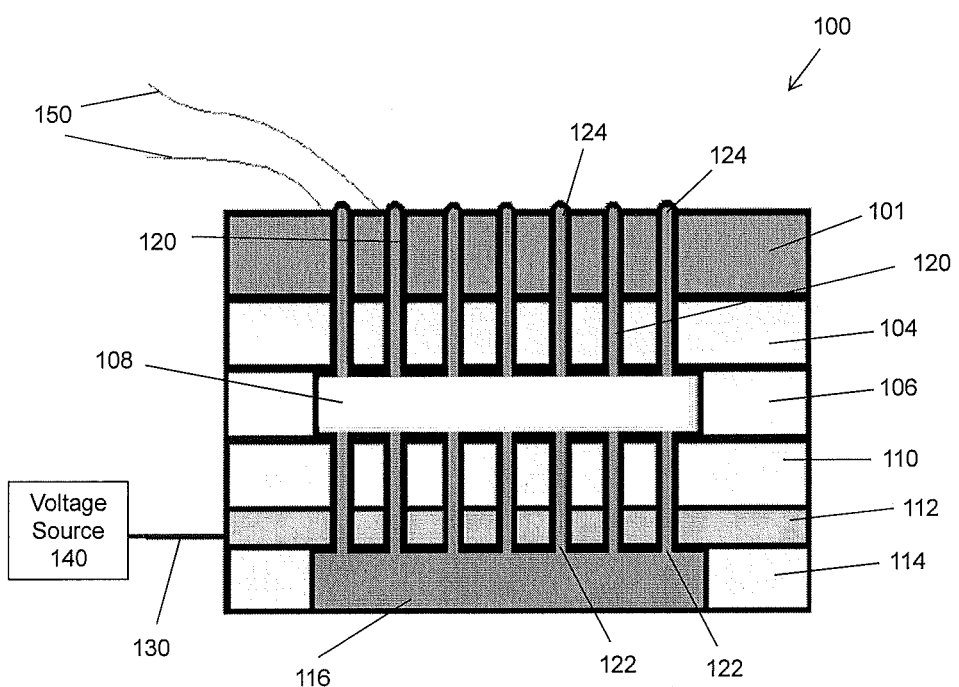
FIG. 2 illustrates a cross-section view of an assembled electro-osmosis system according to the present invention.

As shown in FIG. 1 and FIG. 2, the electro-osmosis system 100 according to the present invention includes various layers of components. One component is in the form of a printed circuit board 101. The printed circuit board 101 has an array of plated fluidic passageways 102. Fluidic passageways 102 can be of any diameter and are plated with a conductive material such as tin/lead (Sn/Pb) plating or a base of copper with a Sn/Pb coating creating individual electrodes 103. Any individual or set of individual objects can be picked up according to how the printed circuit board 101 is oriented and programmed.

Any center-to-center distance between adjacent fluidic passageways 102 in the array is contemplated. In one embodiment, the printed circuit board 101 has a 5×5 array of 508 µm diameter fluidic passageways with a 0.66 mm diameter Sn/Pb plating and a center-to-center distance between adjacent fluidic passageways at 2 mm. However, any sized array of any sized diameter passageways with any sized diameter plating as well as any center-to-center distance is contemplated as determined by the manufacturing application.

The printed circuit board 101 is assembled to a first gasket 104 and the first gasket 104 is assembled to a support plate 106. Support plate 106 houses the borosilicate glass frit 108. The frit 108 includes a plurality of micron-sized conduits 109. It is contemplated that instead of using a purchased borosilicate glass frit 108, a frit could be made in-house by melting glass spheres in an oven to the appropriate conduit size.

A second gasket 110 is assembled to the support plate 106 such that the first gasket 104 and second gasket 110 sandwich the support plate 106 including frit 108 as can be seen by the cross-section assembly view in FIG. 2. The frit 108 acts as the pump and can be of any size thickness. An electrical conductor 112 is assembled to a bottom plate 114 that supports a fluid source reservoir 116.

The layers of the electro-osmosis system 100 are assembled together using a fastening mechanism such as screws. As can be seen specifically in FIG. 2, assembly of the layers creates one or more channels 120 through which liquid flows from the fluid source reservoir 116. Each channel 120 includes an input end 122 and an output end 124 and oriented transversely through the layers of the system 100. To achieve individual control of each channel 120, thermally insulated wires 150 are soldered to the output end 124.

Each layer of the electro-osmosis system 100 is created using printed soft and hard materials such as photocurable plastic and rubber-like materials. The soft material—with a tensile strength 0.8-1.5 psi—allows for a rubber like flexibility, which, under compression when the system 100 is assembled, serves as a means of keeping the water in their directed channels 120. In one embodiment, the first gasket 104 and second gasket 110 are made from a flexible material such as a Tango+ material. The soft Tango+ material allows for a tight fit around the borosilicate glass frit 108, which is integral to ensuring that the system operates correctly and volume is not scavenged from adjacent drops resulting in a single large drop.

In one embodiment, the system 100 is 3D printed such that it is set up for rapid mass production. More specifically, each of the layers in the system 100 is individually 3D printed and assembled. However, it is contemplated that different materials used in the layers, such as Tango+ and FullCure720, can be printed in one process further removing steps in the assembly process. This multi-material printing is already available, but has limitations in terms of quality in printing small features—something necessary in creating the Tango+ gaskets with holes the diameter of the object needed to be picked and placed.

A voltage source 140 is used to apply a voltage through an interconnect 130. However, it is also contemplated that the system 100 may be easily connected to a computer in order to individually control the voltage flowing through each channel 120. This would allow for both positive and negative voltage to be used simultaneously to ensure that each droplet is uniform and consistent amongst the array.

A capillary effect of liquid in each individual channel 120 is initiated by applying a voltage to the electrical conductor 112. In order to activate individual channels 120, the thermally insulated wires 150 soldered to the output end 124 are selected and connected to the voltage source 140. The applied voltage to the electrical conductor 112 activates individual electrodes 103 on command to create water droplets from the fluid source reservoir 116. Specifically, the water droplets are created at the output end 124 of the specific individual channels 120 selected. The water droplets have a surface tension that creates adhesion in order to pick up an object.

Electro-osmosis relies on a layer of excess ions, the electric double layer or Debye layer, naturally present in the liquid adjacent to a solid. An electric field introduced in the surface-parallel direction moves theses ions, which then drags the liquid along the channel by means of viscosity.

An important factor in understanding performance of the system 100 is the velocity of the water droplets. The speed at which these droplets grow is the limiting factor in how quickly items can be picked and placed in a repeatable fashion. More specifically, the size of a droplet grows and shrinks according to the magnitude and the polarity of the voltage passing through the channels 120. Furthermore, voltage can be used periodically without losing peak performance. Voltage can be turned off such that no voltage is applied within the channel 120 while an object continues to stay adhered to a droplet.

Figure 3:
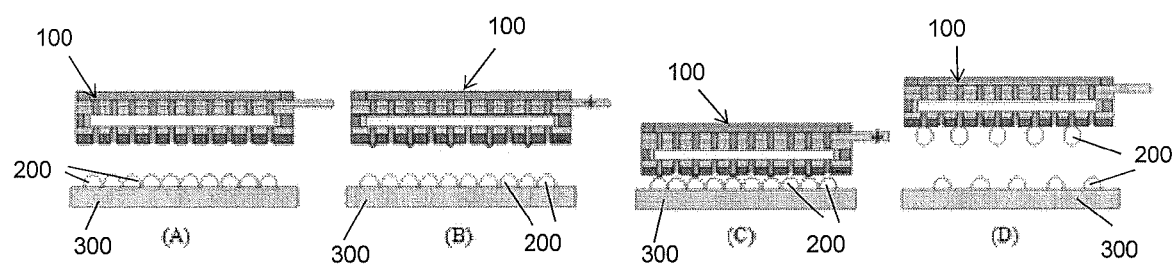
FIG. 3 illustrates the pick-and-place method utilizing the electro-osmosis system of the present invention.

FIG. 3 illustrates the pick-and-place method utilizing the electro-osmosis system 100 of the present invention. A three-dimensional (3D) or "xyz" platform base 300 is provided in order to allow mobility of the electro-osmosis system 100 in all three axes. This allows the electro-osmosis system 100 to pick up objects 200 from any location on the platform base 300 and place them to a target object on any other location on the platform base 300. The platform base 300 is also helpful when objects 200 of varied materials are being assembled, since the platform base 300 would be able to pick from a number of liquid reservoirs and accurately place the objects 200.

Specifically, FIG. 3 illustrates (A) the application of a specified voltage to activate certain selected channels, (B) formation of a droplet, (C) contact of the droplet with an object 200 resulting in adhesion between the droplet and the object 200 (D) the droplet resulting in lifting of the object 200 by creating a peak force and adhesion strength on the object 200. Ultimately the capillary effect is broken and the object 200 is released.

The electro-osmosis system 100 was tested by individually controlling channels including a single channel, all channels, and channels of a certain pattern including a checkerboard, "X" shape, "#" shape, small square, and top hat shape. First, the electrode corresponding to the channel above a single object was activated (15V), and the platform base 300 was lifted such that the object made contact with the formed droplet. No other droplets were formed since the other channels 120 were not activated. After contact was made, the platform base 300 was then lowered, showing the single chosen object to have been removed from the platform base 300 and held against the circuit board 101 via droplet adhesion. The voltage was switched off and the object continued to stay in place. This illustrates how the device uses low voltages only periodically to control droplet motion until the point of contact beyond which capillary forces provide a static holding force in the absence of externally supplied energy. Next, all objects were picked up. A voltage of 15 V was applied to all channels 120. In one embodiment, a superhydrophobic (SHP) coating was applied via vapor deposition to decrease droplet migration by pinning the drops to the channel circumference. Finally, certain channels 120 were isolated thereby exhibiting a deliberate pattern. Instead of assembling multiple components serially in rapid succession, the present invention can pick-and-place all components of the same type simultaneously. The parallel droplet array then picks up only selected objects in the chosen pre-determined configuration and places them onto the target object. The process then repeats for each object type and for each target object layer, leading to selective transportation of millions of objects in parallel. The assembly rate therefore scales with the number of object types and target object layers, rather than with the number of individual objects. Hence it is much more scalable for assembly of target objects comprising large numbers of objects from a large repertoire of types.

The described embodiments are to be considered in all respects only as illustrative and not restrictive, and the scope of the present invention is not limited to the foregoing description. Those of skill in the art may recognize changes, substitutions, adaptations and other modifications that may nonetheless come within the scope of the present invention and range of the present invention.

The invention claimed is:

1. An electro-osmosis system, comprising:
a printed circuit board having an array of fluidic passageways, wherein each fluidic passageway is plated with a conductive material and each fluidic passageway forms part of a channel with an input end and an output end,
an electro-osmosis pump disposed adjacent a bottom major surface of the printed circuit board and operatively associated with one or more channels at the input end,
a voltage source to drive the electro-osmosis pump,
a thermally insulated wire soldered to the output end of the channel and connected to the voltage source to achieve individual control of the channel, and
a fluid source reservoir from which a droplet is created at the output end of the channel when voltage is applied from the voltage source such that the droplet has a surface tension that creates adhesion in order to pick up an object.

2. The electro-osmosis system of claim 1, wherein the conductive material is tin/lead.

3. The electro-osmosis system of claim 1, wherein the electro-osmosis pump is a frit.

4. The electro-osmosis system of claim 3, wherein frit is borosilicate glass.

5. An electro-osmosis system, comprising:
a printed circuit board having an array of fluidic passageways, wherein each fluidic passageway is plated with a tin; lead conductive material and each fluidic passageway forms part of a channel with an input end and an output end,
an electro-osmosis pump disposed adjacent a bottom major surface of the printed circuit board and operatively associated with one or more channels at the input end,
a voltage source to drive the electro-osmosis pump,
a thermally insulated wire soldered to the output end of the channel and connected to the voltage source to achieve individual control of the channel, and
a fluid source reservoir from which a droplet is created at the output end of the channel when voltage is applied from the voltage source such that the droplet has a surface tension that creates adhesion in order to pick up an object.

6. The electro-osmosis system of claim 5, wherein the electro-osmosis pump is a frit.

7. The electro-osmosis system of claim 6, wherein frit is borosilicate glass.

8. An electro-osmosis system, comprising:
- a printed circuit board having an array of fluidic passageways, wherein each fluidic passageway is plated with a conductive material and each fluidic passageway forms part of a channel with an input end and an output end,
- a borosilicate glass frit disposed adjacent a bottom major surface of the printed circuit board and operatively associated with one or more channels at the input end,
- a voltage source to drive the borosilicate glass frit,
- a thermally insulated wire soldered to the output end of the channel and connected to the voltage source to achieve individual control of the channel, and
- a fluid source reservoir from which a droplet is created at the output end of the channel when voltage is applied from the voltage source such that the droplet has a surface tension that creates adhesion in order to pick up an object.

9. The electro-osmosis system of claim 8, wherein the conductive material is tin/lead.

10. The electro-osmosis system of claim 1, wherein the droplet is water.

11. The electro-osmosis system of claim 5, wherein the droplet is water.

12. The electro-osmosis system of claim 8, wherein the droplet is water.

* * * * *